United States Patent [19]
Quarles

[11] Patent Number: 5,797,751
[45] Date of Patent: Aug. 25, 1998

[54] METHOD FOR TRAINING STUDENTS TO WRITE EVENLY SPACED WORDS

[76] Inventor: Pamela L. Quarles, 18 Cordrey Rd., Newark, Del. 19713

[21] Appl. No.: 833,031

[22] Filed: Apr. 3, 1997

[51] Int. Cl.[6] .................................................. G09B 11/04
[52] U.S. Cl. .................................................. 434/162
[58] Field of Search .................................. 434/162, 166

[56] References Cited

U.S. PATENT DOCUMENTS

| | | | |
|---|---|---|---|
| 177,120 | 5/1876 | Harvey | 434/162 |
| 1,324,182 | 12/1919 | Spaul | 434/162 |
| 2,183,063 | 12/1939 | Dorsey | 434/162 |
| 4,170,833 | 10/1979 | Quinn et al. | 434/166 |

*Primary Examiner*—Jeffrey A. Smith
*Attorney, Agent, or Firm*—Ratner & Prestia

[57] ABSTRACT

The invention relates to a method for teaching students, particularly young children, how to write evenly spaced words. This is achieved through training the children to space the words using a spacer having a width equal to the desired spacing and having them practice writing sentences using the spacer to separate each word.

8 Claims, 2 Drawing Sheets

Name Christian Rubert

Today is Monday November 18 1996

Fig. 3

Name Christian Rubert

Today is Tuesday November 19 1996

Fig. 4

METHOD FOR TRAINING STUDENTS TO WRITE EVENLY SPACED WORDS

BACKGROUND OF THE INVENTION

1. Field of the invention

This invention relates to a method for teaching students how to write, and more particularly to a method and related implement for training students to write evenly spaced words.

2. Description of Related Art

Throughout the years, teaching students how to write has been left to an individual teacher's discretion and abilities. Typically students will first be taught to write individual letters, using lined paper. Typically three parallel, horizontal lines are provided and the students are instructed and trained to draw each character inside the three lines. U.S. Pat. No. 177,120, issued in 1876 to L. D. Harvey, addresses this letter writing learning process and provides a gage for teaching penmanship. The gage is a transparent ruler with markings that define the slant of different letters as well as the width of the individual letters. This gage is used by placing it over a text and observing the deviation of the written text from the desired slant of the letters, permitting the scholar to observe his mistakes and correct them.

Another problem in learning how to write resides in the proper spacing of the individual words which form a sentence. A number of students, particularly when the students are very young children or children in special education classes, appear to have difficulty in judging the appropriate spacing of words, producing sentences in which words are separated by spaces of different width, such spacing varying from substantially zero to over an inch. The teacher may demonstrate on the blackboard proper spacing. However, a number of students, particularly the young, have difficulty in understanding and implementing the concept of uniform spacing. Sometimes particularly young students may even lack the physical ability to control their pencil accurately enough to produce an even spaced writing unassisted.

It is an object of the present invention to provide a method for training students to write evenly spaced words and to provide a teacher with the necessary implements to achieve this goal.

SUMMARY OF THE INVENTION

In accordance with this invention there is provided a method for training a student to write uniformly spaced words, comprising a) teaching the student to recognize the beginning and ending of individual words;

b) selecting a first spacer having a first width measured between a left and a right edge of said spacer;

c) providing the student with the selected first spacer;

d) having the student write a plurality of individual words by placing the left edge of the spacer at the end of each written word and by writing each next word beginning at the right edge of the spacer;

e) repeating step (d) a number of times;

f) withholding the spacer from the student and having the student write a plurality of words without the use of the spacer;

g) evaluating the writing resulting in step (f) for word spacing uniformity and if such spacing is not substantially the same as the spacing provided by the use of the spacer, repeating steps (c) through (f) until such spacing is substantially the same;

More than one size spacers may be used to gradually train a student to bring the words closer together.

BRIEF DESCRIPTION OF THE DRAWINGS

The invention can be more fully understood from the following description thereof in connection with the accompanying drawings described as follows.

FIG. 3 shows a typical writing of a student before training using the present method.

FIG. 4 shows a typical writing by the same student who wrote the writing of FIG. 2 following training by the present method.

DESCRIPTION OF THE PREFERRED EMBODIMENT(S)

Figure 1:
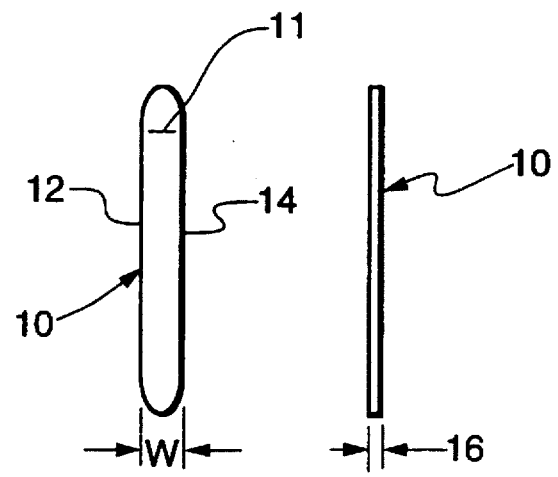
FIG. 1 shows a spacer useful in practicing the present method.

Throughout the following detailed description, similar reference characters refer to similar elements in all figures of the drawings.

Referring now to FIG. 1 there is shown in plan and elevation view a spacer 10 constructed in accordance with the present invention. The spacer consists of a thin elongated piece having a left edge 12 and a right edge 14 and a thickness 16. A spacer width "W" is defined as the distance between the two edges 12 and 14. Typical dimensions for the width range from about 0.25 inches to 0.75 inches, with a preferred size being 0.5 inches. The two edges 12 and 14 are straight edges extending parallel to each other. The preferred length of the spacer is 6 inches.

The spacer may be made out of any material which provides good wear resistance, particularly since its intended users are young students. Wood is one such preferred material, of the type used for tongue depressors. Plastic and cardboard may also be used as well as thin strips of metal. Rubber of the type used in making pencil grips may also be used. It can be transparent or opaque, with opaque being preferred as this makes it easier for young students to align adjacent to the last letter of a written word. It can bear decorative markings.

In the preferred embodiment the spacer further includes a groove or any other form of a visible straight line marking 11, extending from a point located at a distance from the spacer top equal to a typical paragraph indentation as shown in FIG. 1. This marking is used to teach the student the proper spacing of indented paragraphs.

The thickness 16 can also vary and is preferably chosen between $1/16$ inches and $1/4$ inches with $1/8$ inches being the preferred size. Less than $1/16$ inches will work but requires more dexterity on the part of the students since when the spacer is very thin, abutting the pencil point against the right edge of the spacer becomes more difficult.

The method of the present invention contemplates the use of the above described spacer to train students in properly spacing words when learning to write.

The first step involved is teaching students to recognize that words have a beginning and an end and that when writing, the beginning of one word must be placed at a distance from the end of the previous word. Then the students are given the spacer and are instructed to use it as follows.

Figure 2:
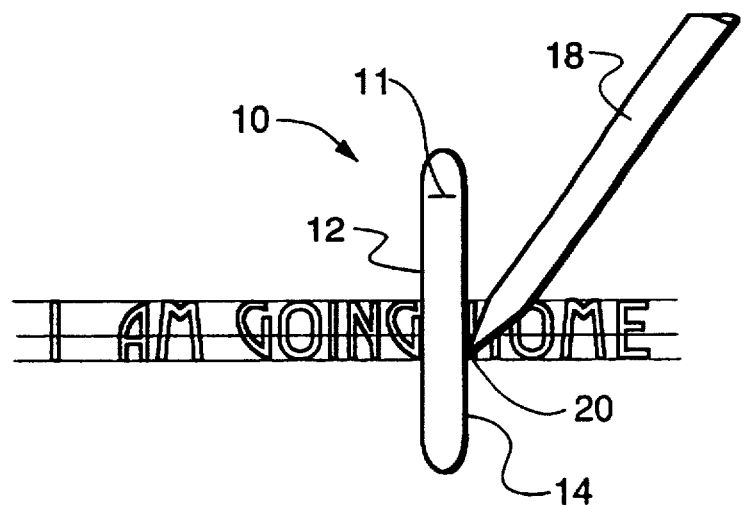
FIG. 2 shows how the spacer is used in training a student.

First they start by writing the first word of a given sentence. Once they have finished writing the first word, they then place the left edge of the spacer so that it just touches the end of the last letter of the first word. Once the spacer has been placed in the proper position, it is held down with the left hand and the student is shown how to place the pencil tip against the right edge of the spacer to begin writing the first letter of the second word. After the first letter of the second word has been drawn, the student is told to remove the spacer and continue with the remaining letters of the word. Upon completing the word, the process is repeated. FIG. 2 shows how the spacer 10 and pencil 18 are used in writing the phrase "I am going home." The spacer 10 is shown placed after the word "going" with the left edge 12 adjacent the letter "g". The pencil 18 tip 20 is shown placed against the right edge of the spacer to begin writing the word "Home".

The student is given a plurality of exercises involving writing a plurality of words, which may form sentences, until the teacher feels that it is time to test the student by removing the spacer. The student is asked to write a sentence or sequence of words without the aid of the spacer. The teacher observes the result and decides whether the spacing is regular or uniform enough to be acceptable. If it is, the spacer is no longer used. If not, the student is given the use of the spacer again and the process is repeated.

There are students who may have greater difficulty than expected placing words close enough as is required in normal writing. These students may use more than one spacers starting with a first one having a first width "W", which may be as great as ¾ inches. After the student masters this spacing, a second spacer may be used with a second width "W'" which is ¼ inches ( W less than W') to train the student to a closer, more common, spacing of words in increments rather than in one step.

The above method was used to train students as follows: The students were first given sentences to copy without using the spacer. Problems noted were inconsistent spacing between letters in the words, between the distance of each word, and difficulty printing on the lines. In one specific case, the student's spacing between words varied between 5/16 inches and 2¼ inches. The student was trained using the spacer over a two and one half month period. At the end of this period this student's writing improved as follows. The spacing between each word was about ¾ inches to a maximum of one inch, the letters and numbers in nine out of fourteen words were printed neatly next to each other, on the lines.

In a second example shown in FIGS. 3 and 4 the improvement of the student's ability to separate words was greatly enhanced through the use of the spacer. FIG. 3 illustrates the student's efforts in writing his name and the sentence "today is Monday, Nov. 18 1996". Following only one day's instruction with the spacer, the student was able to write his name and the sentence "today is Tuesday Nov. 19 1996"as shown in FIG. 4. The improvement in word spacing is obvious.

It sometimes happens that a particular student may have a problem spacing certain specific words or combination of words. In such cases, the teacher will first identify the problem words or combination of words and will train the student using such selected plurality of words in the exercises provided to the student even if such combinations are not full or meaningful sentences.

The spacer may further be used to keep letters and words in line by placing the spacer horizontally and starting and ending each letter by bringing the pencil tip against an edge of the spacer. This again has the effect of training the student to start and terminate letters along a straight line providing for a more readable text.

Those skilled in the art, having the benefit of the teachings of the present invention as hereinabove set forth, can effect numerous modifications thereto. These modifications are to be construed as being encompassed within the scope of the present invention as set forth in the appended claims.

I claim:

1. A method for teaching students to write uniformly spaced words, comprising a) teaching the student to recognize the beginning and ending of individual words;

b) selecting a first spacer having a left edge and a right edge;

c) providing the student with the selected first spacer;

d) having the student write a plurality of individual words by placing the left edge of the spacer at the end of each written word and by writing each next word beginning at the right edge of the spacer;

e) repeating step (d) a number of times;

f) withholding the spacer from the student and having the student write a plurality of words without the use of the spacer;

g) evaluating the writing, resulting in step (f) for word spacing uniformity, and if such spacing is not acceptably uniform, repeating steps (c) through (g) a number of times until the spacing of the written words is substantially uniform.

2. The method of claim 1 wherein the spacer also has a width measured between said left edge and said right edge and wherein the width is between 0.25 and 0.75 inches.

3. The method according to claim 1 wherein the plurality of words in step (d) is a sentence.

4. The method according to claim 1 including the additional step of determining a selected plurality of words which the student has difficulty writing prior to step (d) and using this selected plurality of words in step (d).

5. A method for improving the writing abilities of a student, comprising a) teaching the student to recognize the beginning and ending of individual words;

b) selecting a first spacer having a left edge and a right edge, and a first width measured between said left and right edges;

c) providing the student with the first spacer;

d) having the student write a plurality of individual words by placing the left edge of the spacer at the end of each previously written word and by writing each next word beginning at the right edge of the spacer;

e) repeating step (d) a number of times;

f) withholding the spacer from the student and having the student write a plurality of words without the use of the spacer;

g) evaluating the writing resulting in step (f) for word spacing uniformity and if such spacing is not substantially the same as the spacing provided by the use of the spacer, repeating steps (c) through (f) until such spacing is substantially the same;

h) selecting a second spacer also having a left edge, a right edge, and a second width measured between said second left and right edges, the second width being less than the first;

i) providing the student with said second spacer; and j) repeating steps (d) through (g) using the second spacer.

6. The method of claim 5 wherein the first spacer is selected to have a width between 0.25 and 0.75 inches.

7. The method according to claim 5 wherein the plurality of words in step (d) is a sentence.

8. The method according to claim 5 including the additional step of determining a selected plurality of words which the student has difficulty writing prior to step (d) and using this selected plurality of words in step (d).

* * * * *